(No Model.)

W. A. HESS.
FRUIT BASKET.

No. 387,073. Patented July 31, 1888.

WITNESSES.
G. S. Elliott
E. W. Johnson

William A. Hess.
INVENTOR,

Attorney

UNITED STATES PATENT OFFICE.

WILLIAM A. HESS, OF PULTNEY, NEW YORK.

FRUIT-BASKET.

SPECIFICATION forming part of Letters Patent No. 387,073, dated July 31, 1888.

Application filed February 9, 1888. Serial No. 263,483. (No model.)

*To all whom it may concern:*

Be it known that I, WILLIAM A. HESS, a citizen of the United States of America, residing at Pultney, in the county of Steuben and State of New York, have invented certain new and useful Improvements in Fruit-Baskets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in fruit-baskets; and it consists in the novel construction and arrangement of the parts thereof, which will be more fully hereinafter described, and particularly pointed out in the claim.

The object of my invention is to provide a fastening for the cover of baskets, which is integrally formed with the support or handle, and whereby the cover or lid may be placed upon the top of the basket and secured without longitudinally withdrawing or shoving the same thereover. I attain this object by the construction illustrated in the accompanying drawings, wherein like letters of reference indicate similar parts in the several views, and in which—

Figure 1:
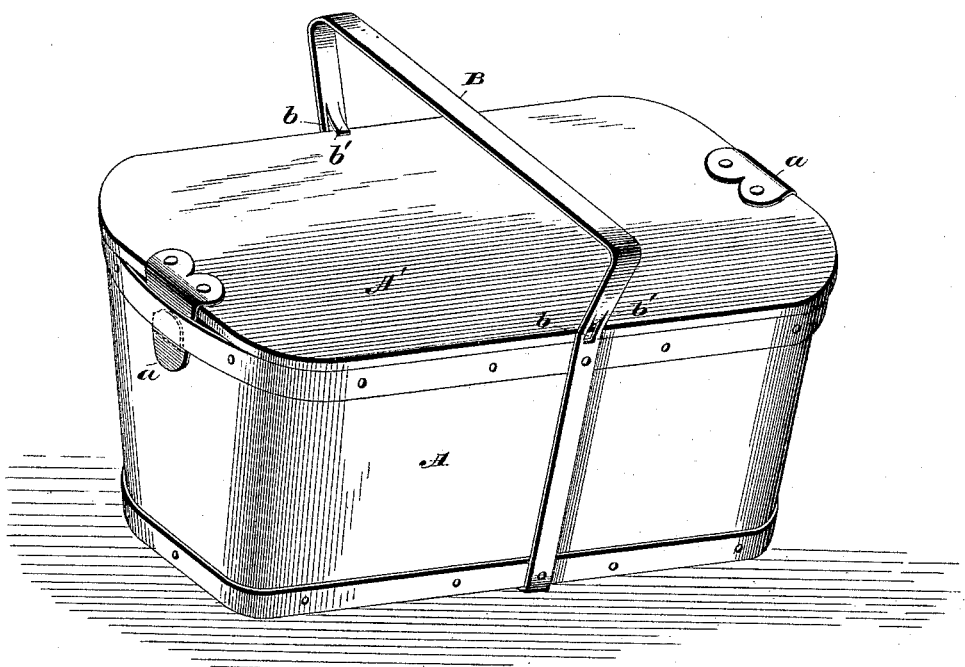
Figure 2:
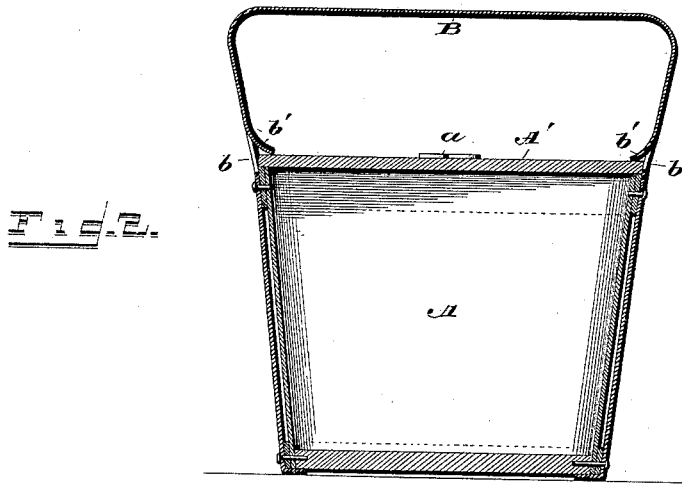

Figure 1 is a perspective view of a basket commonly known as a "grape-basket," showing my improvement connected thereto. Fig. 2 is a transverse vertical section thereof.

A indicates the body of the basket, which is formed with the usual upper and lower bands; and A', the cover, which is of ordinary construction and provided with end securing-cleats, $a$. A metallic handle, B, is provided and secured to the sides of the basket and bent under the bottom thereof, as fully shown in Fig. 2. The upper portion of the handle B projects some distance above the lid, and at the point where it leaves the upper edge of the sides of the basket it is bent outwardly at an angle. A slot, $b$, is cut in the said handle B at a point slightly above the top edge of the basket, and the metal thus released by forming said slot is bent inward and downward at an incline to form the inwardly-projecting burrs $b'$.

To secure the cover or lid upon the basket, it is placed under the handle and the clips pressed into the openings between the upper band and the top edge of the basket and secured. During this operation the lid rests on the burrs $b'$, and when the clips are secured the cover is pressed down, forcing the flared sides of the handle slightly outward and springing under the said burrs $b'$, and the cover of the basket is thereby secured. To release the cover or lid from the top of the basket, one side of the handle is drawn outward slightly until the projection or burr $b'$ upon said side of the handle is disengaged from the edge of the cover, when the cover is raised at this side. It may then be readily withdrawn from the oppositely-situated projection or burr $b'$ and removed from the basket. The burrs $b'$ may be extended inward at right angles, if desired, and in applying the lid or cover the sides of the basket are pressed outward.

It will be understood that the end fastenings, $a$, will be released before attempting to remove the cover.

The advantage gained by this form of securement over those heretofore used is, that the cover may be raised directly from the basket, and the longitudinal sliding movement thereof is avoided, the said movement tending to mash or crush the upper layer of grapes or fruit contained in the basket.

I claim—

The combination, with the basket and the cover therefor, of a handle constructed of strap or band metal secured to the basket and flaring outwardly from the upper edge thereof, and having integral burrs cut and bent inward from its center immediately above the edge of the basket to secure the cover, in the manner set forth.

In testimony whereof I affix my signature in presence of two witnesses.

WILLIAM A. HESS.

Witnesses:
NELSON RETAN,
JOHN PRENTISS.